(12) United States Patent
Dagum et al.

(10) Patent No.: US 7,917,463 B2
(45) Date of Patent: Mar. 29, 2011

(54) SYSTEM AND METHOD FOR DATA WAREHOUSING AND ANALYTICS ON A DISTRIBUTED FILE SYSTEM

(75) Inventors: Paul Dagum, Santa Moncia, CA (US); Tarandeep Singh, Santa Comica, CA (US); Leonardo Dagum, Redwood City, CA (US)

(73) Assignee: Business.com, Inc., Santa Monica, CA (US)

( * ) Notice: Subject to any disclaimer, the term of this patent is extended or adjusted under 35 U.S.C. 154(b) by 411 days.

(21) Appl. No.: 12/249,780

(22) Filed: Oct. 10, 2008

(65) Prior Publication Data
US 2009/0055370 A1 Feb. 26, 2009

(51) Int. Cl.
*G06F 17/30* (2006.01)
(52) U.S. Cl. ......... 707/600; 707/714; 707/759; 707/822
(58) Field of Classification Search .................. 707/600, 707/714, 759, 822
See application file for complete search history.

(56) References Cited

U.S. PATENT DOCUMENTS

| | | | |
|---|---|---|---|
| 6,968,335 B2 | 11/2005 | Bayliss et al. | |
| 7,185,003 B2 | 2/2007 | Bayliss et al. | |
| 2005/0004904 A1* | 1/2005 | Kearney et al. | 707/3 |
| 2005/0033741 A1* | 2/2005 | Dombroski et al. | 707/3 |
| 2007/0174278 A1 | 7/2007 | Ramesh et al. | |
| 2008/0086442 A1 | 4/2008 | Dasdan et al. | |
| 2008/0120314 A1 | 5/2008 | Yang et al. | |
| 2008/0127146 A1* | 5/2008 | Liao et al. | 717/150 |

\* cited by examiner

*Primary Examiner* — Cheryl Lewis
(74) *Attorney, Agent, or Firm* — Husch Blackwell LLP; Mark E. Stallion

(57) ABSTRACT

A computer implemented method for executing an ANSI SQL expression belonging to the SELECT-WHERE-equi-JOIN class on data residing in a distributed file system, said method comprising the steps of entering the ANSI SQL expression into a user interface; converting the ANSI SQL expression into a map-reduce program; running the map-reduce program on the distributed file system; storing the result set of the program in the distributed file system; and presenting the result set through a user interface.

11 Claims, 12 Drawing Sheets

US 7,917,463 B2

SYSTEM AND METHOD FOR DATA WAREHOUSING AND ANALYTICS ON A DISTRIBUTED FILE SYSTEM

TECHNICAL FIELD

The present invention relates to the field of data warehousing, and more specifically to querying data using ANSI Structured Query Language (SQL) expressions when the data resides in flat files over one or more local file systems connected by a network, by converting the SQL queries into a map-reduce program and executing the map-reduce program either directly on the local file system or on a distributed file system.

BACKGROUND OF THE INVENTION

Businesses running enterprise systems maintain detailed log data that is written by the production systems into flat files. Example data include (i) web log data tracking user activity on a e-commerce or other website; (ii) telephone log data from large telecommunications providers; (iii) system monitoring log data in large IT operations where systems track and monitor events. For large enterprises, this data reaches terabyte and petabyte sizes and resides over multiple storage devices. The existing approaches for querying this data involves the process of data extraction, transform, and load (ETL) wherein the data is loaded into a relational database management system (RDBMS). This process is expensive, time consuming, and for large data sizes it requires a significant investment in managing and maintaining a cluster of RDBMS to enable efficient querying of the data. The hardware and personnel investment cost alone is prohibitive for all but the largest of enterprises when the data sizes reach terabytes. Yet even small internet sites and e-commerce sites can generate terabytes of data. The prohibitive cost of creating and maintaining the appropriate size cluster of RDBMSs makes access to the information and knowledge stored in much of that data inaccessible to those businesses. For larger enterprises, procurement and maintenance cost may be less of an issue, but the opportunity cost from delays in accessing the data can be material especially when new data sources need to be accessed. The typical time span required to go from flat files to ETL and to a performance ready cluster of RDBMS is measured in months.

Current efforts at making tera- and petabyte business data accessible have focused either on improving the performance of the cluster of RDBMS systems when processing the data or at using a map-reduce programming framework [3, 5] for extracting ad-hoc information from the data.

The first approach is RDBMS centric and involves horizontal partitioning of tables across multiple nodes in the cluster and customizing the query processing component of the RDBMS to enable parallel execution of SQL expressions.

The second approach involves using a map-reduce programming framework to extract ad-hoc information from flat files. These approaches range from Google's Sawzall [8] which requires the user to write a map-reduce program specific to the task to Yahoo's PIG [7] and Facebook's HIVE [1] where the user interacts through a query or programming abstraction interface where the queries/programs articulate data analysis tasks in terms of higher-level transformations. HIVE provides some data warehousing functionality.

Recently, two vendors in the RDBMS space, Aster [2] and Greenplum [6] have bundled map-reduce programming functionality into their products allowing a user to write a map-reduce program in a variety of popular scripting languages (such as Python or Perl) and run the program through their RDBMS client interface.

PIG and HIVE create a high-level programming language that allows the user to program their requirements versus a declarative language where the user expresses what they need. PIG is not designed as a database system and therefore does not support key features such as (i) separation of the schema describing the data from the application that uses the data; (ii) indexing of the data to optimize performance; or (iii) views so that the application programs do not need to be rewritten when the schema changes.

HIVE requires processing of the data in the local file systems with the objective of storing the data in a unique format necessary for HIVE to operate on the data [1, 9]. This step is reminiscent of the costly and time consuming ETL step of RDBMS systems.

SUMMARY OF THE INVENTION

The map-reduce approaches such as PIG and Sawzall differ from the current invention in several key respects. The most obvious point of differentiation is that the primary objective of those systems is to create a programming language on top of map-reduce.

HIVE provides some data warehousing functionality, but in contrast to HIVE, (i) the present invention creates a database system directly on the flat files and converts input ANSI SQL expressions into map-reduce programs for processing the expression on those flat files; (ii) the present invention allows data-centric applications that access data through ANSI SQL expressions to continue to operate correctly even as data layouts and database hardware evolves. Existing application programs, such as reporting applications, business intelligence tools, OLAP systems, and data mining applications can use this invention as their database system without the user having to rewrite the application program; (iii) the present invention does not require the user or application to pre-process the data residing on the local file system as a pre-condition for analysis.

The BCAT aggregate operator is unique to the present invention and it is not supported by RDBMS systems, HIVE, or PIG, and nor can it be derived directly from ANSI SQL expressions. In analyzing website traffic, for example, a user is often interested in aggregating user sessions on the website by the nodes (pages) they visited during the session. In a traditional RDBMS representation, the session ID and node ID need to be columns and hence the user's path through the website is stored in multiple records. This representation is termed a "denormalized" representation and is necessary because the data warehouse designer does not know a priori how many nodes the user may visit in a single session. The business analyst is interested in grouping the sessions by the user's path, that is, by the nodes visited and in the order they were visited. Based on those groupings the analyst will compute financial and user metrics of interest. There is no easy way to create those groupings using ANSI SQL and/or existing RDBMS systems. The approach would entail determining the longest user path, say M, and creating a normalized representation of the data which included M node columns to transform what is a row-oriented computation into a column-oriented computation that ANSI SQL can support. The above transformation of the data would be prohibitive for even moderately large data sets. Furthermore, the length of the longest path may continue to increase with new data, requiring in the worst case, the business analyst or data warehouse administrator to re-transform the data multiple times. The same problem cannot be solved by a column-oriented database, the latter which would also entail the same transformation of the data.

More generally, the BCAT aggregate operator emphasizes a key aspect of the present invention that enables the analyst to create new dimensions from the data on-the-fly using row values. The RDBMS solution is to create a normalized representation of the data that contain the dimensions of interest. Creating such a representation requires creating a schema and the ETL process and programs to load the denormalized data into the new schema. That process is expensive and time consuming, and introduces significant performance bottlenecks that make it intractable for large data sets. That is one of the problems solved by the present invention. Log data produced by production systems is universally denormalized, and because the objective of this invention is to enable analysts and applications to process ANSI SQL queries directly on those data files without going through the complex and time consuming process of defining the schemas and writing ETL, the BCAT command enables the end-user, the business analyst, to create any number of on-the-fly dimensional views of the data by scripting ANSI SQL expressions.

By way of illustration, we describe a SQL expression that contains the BCAT aggregate operator for use in analyzing financial performance data on a website property. Let sessionID denote the unique id for a session, nodeID denote the unique page id, timeID denote the time at which the user visited a particular page, and revenue the revenue generated by that user on that page. The following ANSI SQL query together with BCAT, aggregates sessions and total revenue for sessions that have the same navigation path on the website:

```
SELECT path, COUNT(path), SUM(pathRevenue) FROM
(SELECT sessionID, BCAT (nodeID) AS path, SUM(revenue) AS
pathRevenue
FROM (SELECT sessionID, nodeID FROM <weblog table> ORDER BY
timeID)
GROUP BY sessionID)
GROUP BY path
```

The use of the BCAT aggregate operator on nodeID creates a new dimension path that is the concatenation of the node IDs in the order they were visited by the user. The outer select aggregates over the new path dimension.

BRIEF DESCRIPTION OF THE DRAWINGS

FIG. 5($b$) is a flow chart illustrating an exemplary process for converting an ANSI SQL query containing a GROUP BY and HAVING command into a map-reduce program comprising one mapper program and one reducer program in accordance with one embodiment of the present invention.

FIG. 6($b$)-($d$) each are portions of a flowchart of variations of the process of FIG. 6($a$) with FIG. 6($b$) illustrating an exemplary process for the map-reduce reducer program of an ANSI SQL query that performs a left-outer equi-join, with FIG. 6($c$) illustrating an exemplary process for the map-reduce reducer program of an ANSI SQL query that performs a right-outer equi-join, and with FIG. 6($d$) illustrating an exemplary process for the map-reduce reducer program of an ANSI SQL query that performs a full-outer equi-join, all three in accordance with one embodiment of the present invention.

DETAILED DESCRIPTION OF THE INVENTION

The following detailed description of the invention contains many specifics for the purpose of illustration. Anyone of ordinary skill in the art will appreciate that many variations and alterations to the following details are within scope of the invention. Accordingly, the following embodiments of the invention are set forth without any loss of generality to, and without imposing limitations upon, the claimed invention.

Figure 1:
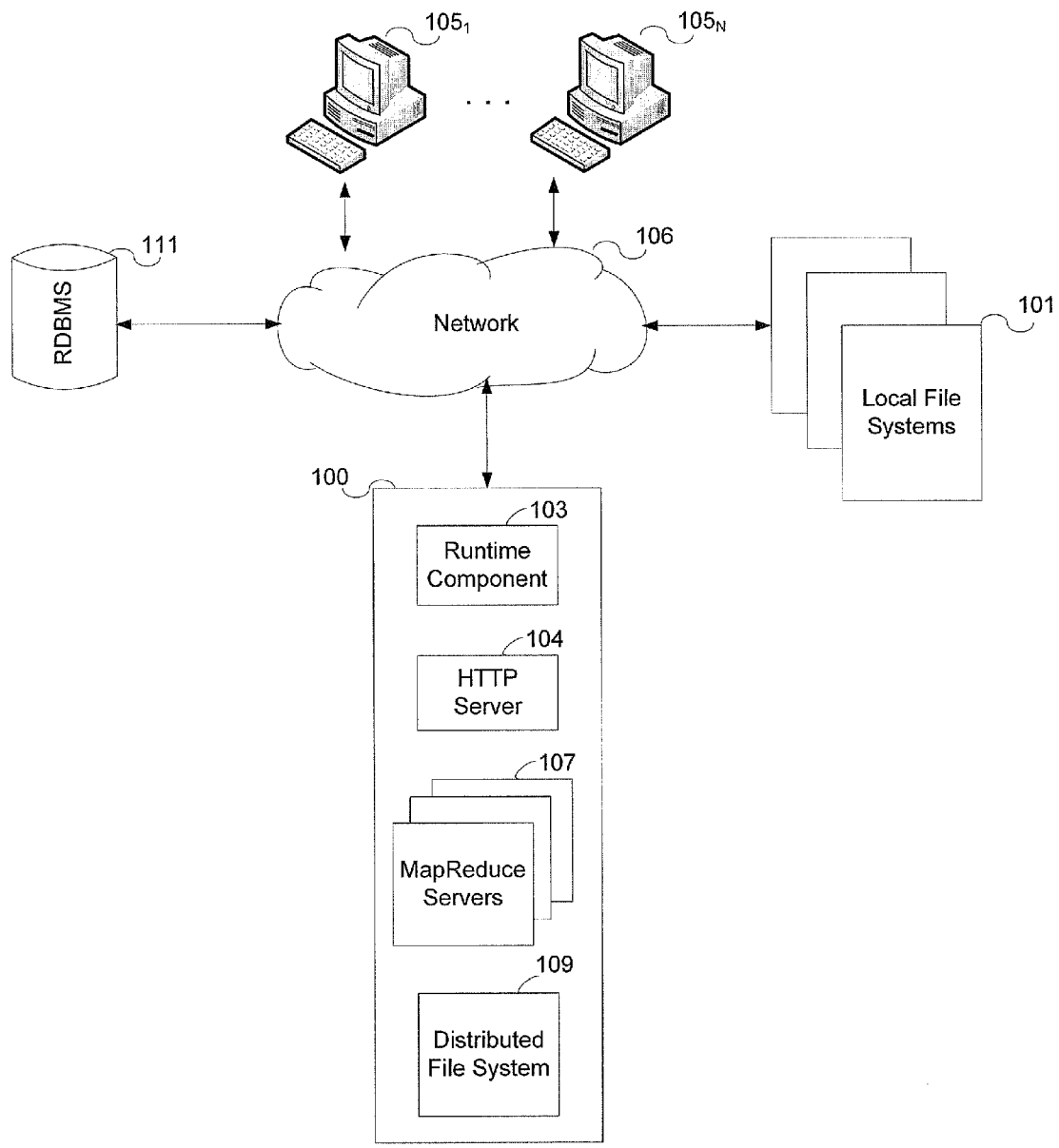
FIG. 1 illustrates an exemplary computing and data communications environment configured in accordance with one embodiment of the present invention.

FIG. 1 illustrates an embodiment of the computing and data communications environment configured in accordance with the present invention and is not intended to limit scope as one of ordinary skill would understand on review of this application that other configurations could be utilized without departing from the claimed invention. Each client computer system $105_1 \ldots 105_N$ includes a network interface that enables communication with the application server 107 over network 106. The network may be a local-area network where both the client system 105 and the server system 100 reside at the same general location, or there may be network connections between geographically distributed systems, including network connections over the internet. Client system 105 includes a central-processing unit (CPU), one or more memory units, a storage device with various applications residing there on, an input mechanism, an output mechanism, coupled by a bus and an operating system configured to manage the interaction between the computer hardware and software applications running on the client system 105.

The server system 100 may include hardware components and an operating system similar to the client component. Accordingly, the server system generally includes one or more CPUs, one or more memory units, one or more storage devices with various applications residing there on, an input mechanism, an output mechanism coupled by a bus, and an operating system.

The client-server configuration shown in FIG. 1 is exemplary of one configuration and is not intended to limit scope as one of ordinary skill would understand on review of this application that other configurations could be utilized without departing from the claimed invention. Embodiments of the present invention may be implemented using other configurations including clusters of servers connected by a network, configurations where the server system is deployed in a grid computing architecture or a cloud computing architecture, configurations that include network storage appliances, and configurations where both the client and servers reside in a single computer system.

In one embodiment of the present invention, users interact with the server system 100 using a graphical user interface (GUI) for SQL query building such as may be provided by an RDBMS client running on the client system 105. In such an embodiment, the client application may be configured to allow the user to compose a SQL query and submit the query to the runtime component 103. In another embodiment, the client system may transmit the SQL query to the runtime component using a Simple Object Access Protocol (SOAP) over Hypertext Transfer Protocol (HTTP). In such an embodiment, HTTP server 104 (e.g., open source Apache web-server program or Microsoft's Internet Information Server) processes the SOAP query request from the client and transmits the query to the runtime component.

Upon receiving the SQL query from the client, the runtime component 103 generates one or more map-reduce mapper programs and one or more map-reduce reducer programs from the input SQL query and transmits these programs to the MapReduce servers 107 for execution. The MapReduce servers include mapper slave servers and reducer slave servers. The run-time component assigns the mapper programs to the mapper slaves and the reducer programs to the reducer slaves. The data input for the mapper programs on each mapper slave may be in local file systems 101 accessible through the network 106 or on a distributed file system 109. In one embodiment of the present invention, when the data resides on local file systems 101, the data is copied to distributed file system 109 to improve execution throughput. In another embodiment of the present invention, the storage device of each mapper slave server is used for the underlying physical storage of the distributed file system 109.

The runtime component may be configured to write query results to the to local file systems 101, to the distributed file system 109, or to the database of an RDBMS server 111. The client can access the query results in the local file system 101 or distributed file system 109 directly through the network, and access the query results published to a database table in the RDBMS server 111 through an RDBMS client after establishing a network connection to the RDBMS server 111.

Figure 2:
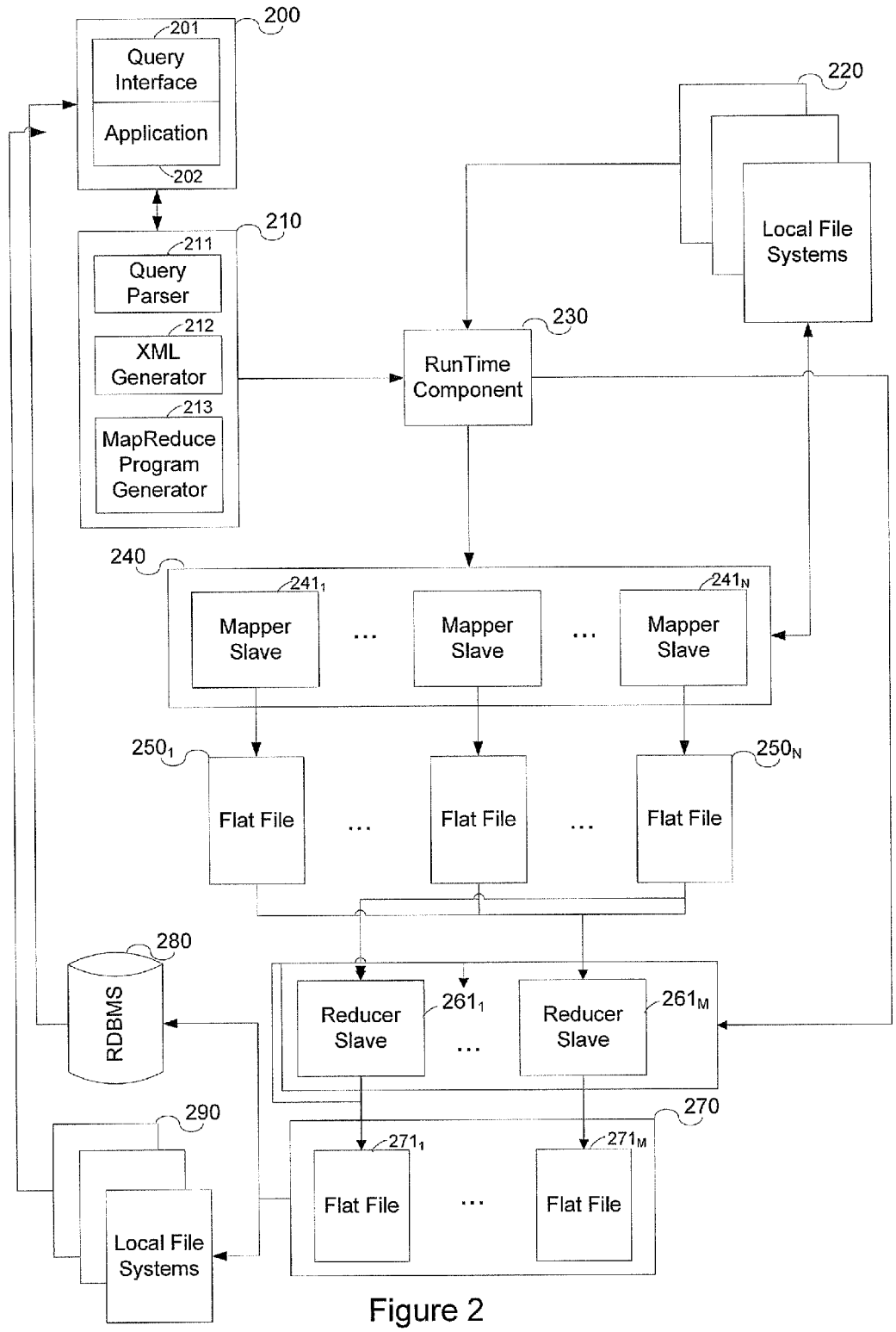
FIG. 2 illustrates an exemplary process of the data manipulations from input ANSI SQL query and flat files to the output result set in accordance with one embodiment of the present invention.

FIG. 2 illustrates an exemplary process of the data manipulations from input ANSI SQL query and flat files to the output result set in accordance with one embodiment of the present invention and is not intended to limit scope as one of ordinary skill would understand on review of this application that other configurations could be utilized without departing from the claimed invention. Referring to FIG. 2, a user or a software application program 202 (e.g., OLAP reporting applications or data mining applications) inputs an ANSI SQL expression where a user employs a command line interface or the SQL graphical-user interface provided by a 3rd party RDBMS client 201 (e.g., Microsoft SQL Client). The ANSI SQL expression is transmitted to the SQL-MapReduce database system 210 using the driver 200 that supports the Java Database Connectivity (JDBC) and Open Database Connectivity (ODBC) protocols. The connection driver 200 must be loaded into the application server running application 202 or into RDBMS client 201.

Upon receiving the ANSI SQL expression, the SQL-MapReduce database system runs a query parser 211 on the query and then runs an XML generator 212 that generates an XML representation of the parsed command and its arguments that may include meta data information about the data and tables. The XML representation is submitted to the MapReduce program generator 213 that uses that input to implement one or more mapper programs and one or more reducer programs. The SQL-MapReduce database system 210 then sends the mapper programs and reducer programs generated by the MapReduce program generator 213 to the runtime component 230.

Runtime component 230 assigns the mapper programs to mapper-slave server cluster 240 and assigns the reducer program to reducer-slave server cluster 260. Mapper slave servers $241_{1-N}$ each receive a copy of the mapper programs which they store in their local storage device. Reducer-slave servers $261_{1-M}$ each receive a copy of the reducer programs which they store in their local storage device.

Flat files are assumed to reside on the local file systems 220 of one or more servers or on storage devices. According to one embodiment of the present invention, an application or user can request the data residing in those files to be copied to a distributed file system (DFS) that uses the underlying physical storage of the mapper slave cluster 240.

To copy the local file data 220 to the DFS on the mapper-slave cluster 240, the application 202 or the user through the query interface 201 enters the CREATE TABLE command with the following syntax into the query interface 201:

---

CREATE TABLE <table name> (<column name><data type>[, <column name><data type>,...])
COLUMN SEP <string>[DFS PATH <DFS path>][IMPORT DATA FROM <local path>][COMMENT <string>]

--- where in this syntax, expressions enclosed by < >are inputs and expressions enclosed by [ ] are optional. In the above operator, (i) the column name and data types defines the table schema; (ii) the string value of the COLUMN SEP defines the string used to delimit the fields in the data files; (iii) the DFS PATH clause instructs the system to copy the data into that directory in the DFS or to create a new one when that clause is not specified; (iv) the IMPORT DATA FROM clause instructs the system to copy files from the specified location in the local file system; and (v) the COMMENT clause is used to associate a comment with the table at creation.

The CREATE TABLE command is transmitted to the SQL-MapReduce database system 210 using driver 200. Upon receiving the ANSI SQL expression, the SQL-MapReduce database system runs a query parser 211 on the CREATE TABLE command and then runs an XML generator 212 that generates an XML representation of the parsed command and its arguments. The XML representation is submitted to the runtime component 230 that executes the transfer copy of data from local file systems 220 to the mapper-slave server cluster 240.

Upon receiving their assigned copy of the mapper programs, each mapper-slave server executes the first mapper program on the flat files. In one embodiment of the present invention the files are accessible through a DFS and resides locally on the mapper slave server. The outputs of the mapper programs running on mapper slaves $241_{1-N}$ are written locally to flat files $250_{1-N}$ on the mapper-slaves' storage device. Reducer-slave servers $260_{1-M}$ make remote reads of the flat files $250_{1-N}$ and execute their first reducer programs on these files. The output from reducer-slaves $260_{1-M}$ is written locally to flat files $270_{1-M}$ on the reducer-slaves' local storage devices. Additional mapper and reducer programs are run similarly. The final result set 270 is a flat file that may be copied to a local file system 290 or into an RDBMS database 280.

To use RDBMS 280 to store the result set, the application 202 or the user through the query interface 201 creates a database link to the RDBMS server using the following command:

```
CREATE DATABASE LINK <link name>
CONNECTION URL <connection url for rdbms>
DRIVER <rdbms driver class name> [ USER <username> PASSWORD
<password> ][ property val, ... ]
```

The CREATE DATABASE LINK command is transmitted to the SQL-MapReducer database system using the loaded driver 200, parsed by query parser 210, converted into XML by XML generator 212, and transmitted to the runtime component for execution.

For example, to make a link to the SQL server database provided by Microsoft, the user runs the following command:

```
CREATE DATABASE LINK sqlserverlink CONNECTION URL
'jdbc:sqlserver://yourhost:8888;user=user;password=password;
databaseName = yourdatabase'
DRIVER 'com.microsoft.sqlserver.jdbc.SQLServerDriver'
```

Once the user has created the database link, the application 202 or the user through the query interface 201 can issue the following command to instruct the system to insert the result set into an existing table in the RDBMS server:
INSERT INTO <table name>@<link name>
For example, if the user created the preceding SQL database link, sqlserverlink, then the following command

```
INSERT INTO mytable@sqlserverlink SELECT FirstName, LastName
FROM nametable
``` would insert result set 270 corresponding to the following query
SELECT FirstName, LastName FROM nametable
into the RDBMS table $_{mytable}$ in RDBMS 280.

The result set in the local file systems 290 or RDBMS 280 is accessible to application 202 and to the user through either the command line interface or query interface 201.

Figure 3:
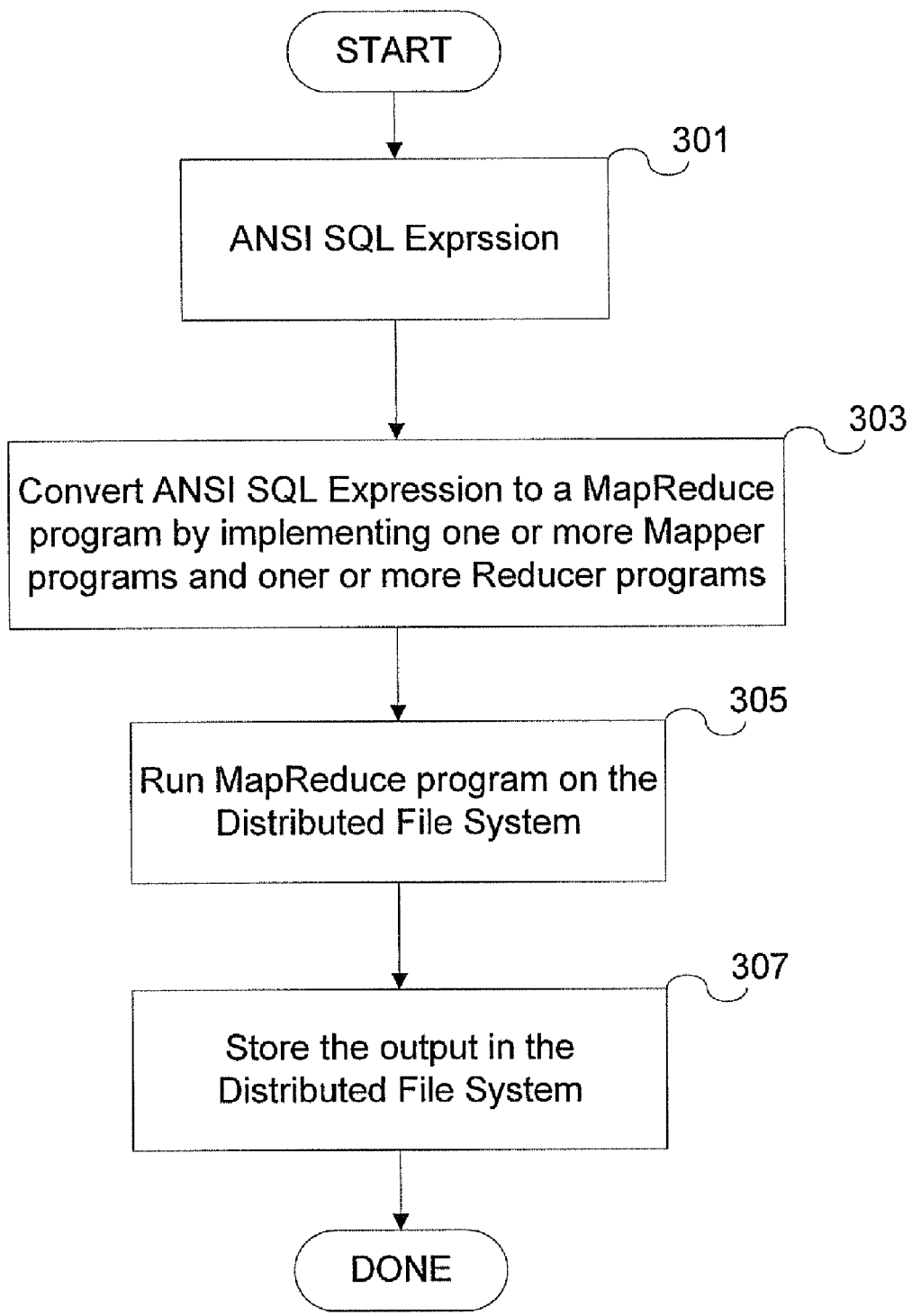
FIG. 3 is a flow chart illustrating an exemplary process for converting an ANSI SQL query into a map-reduce program, running said program on a distributed file system and storing the output in the same file system in accordance with one embodiment of the present invention.

FIG. 3 is a flow chart illustrating an exemplary process for converting an ANSI SQL query into a map-reduce program, running said program on a distributed file system and storing the output in the same file system in accordance with one embodiment of the present invention and is not intended to limit scope as one of ordinary skill would understand on review of this application that other configurations could be utilized without departing from the claimed invention.

ANSI SQL expression 301 can be expressed in the following recursive grammar:

```
SELECT [ DISTINCT ][ TOP n]<select list> [INTO <into element>]
FROM <element> [ AS <alias> ](, <element> [ AS <alias> ] )*
[ WHERE <condition> ] [ GROUP BY <group
by list> ] [ HAVING <condition> ]
[ORDER BY <order by list>]
``` where (i) <select list> is a comma-separated list of column names selected from the <element> inputs in the SQL expression or is a mathematical expression with column name inputs; (ii) <element> is either a table name <table> or an ANSI SQL subquery enclosed in parenthesis ( ); (iii) <into element> is a table name; (iv) <group by list> is a comma-separated list of column names selected from the <element> inputs in the SQL expression; (v) <order by list> is a comma-separated list of column names selected from the <element> inputs; (vi) <condition> is a boolean expression.

In one embodiment of the present invention, ANSI SQL expression 301 is converted to one or map-reduce mapper programs and one or more map-reduce reducer programs 303. The mapper programs and the reducer programs are executed on data residing in a distributed file system 305 and the result set is written back to the same distributed file system 307.

In another embodiment of the present invention, the mapper programs and the reducer programs are executed on data residing in local file systems.

In another embodiment of the present invention, the result set is written back to local file systems or to the database of an RDBMS server.

The following description of one embodiment of the present invention describes flow charts that convert an ANSI SQL expression into a map-reduce program for the case when <element> is a table. For the case when <element> is an ANSI SQL subquery, one skilled in the art will appreciate that the subquery is first implemented as a map-reduce program in accordance to the method described for <table>, and the results of that map-reduce program are stored in a table created in the distributed file system using the CREATE TABLE command that gives the newly created table a reference name.

In one embodiment of the invention, the methods that are used by the system to convert an ANSI SQL query into a map-reduce program are described in the following description. Anyone of ordinary skill in the art will appreciate that many variations and alterations to the following details are within scope of the invention.

Figure 4:
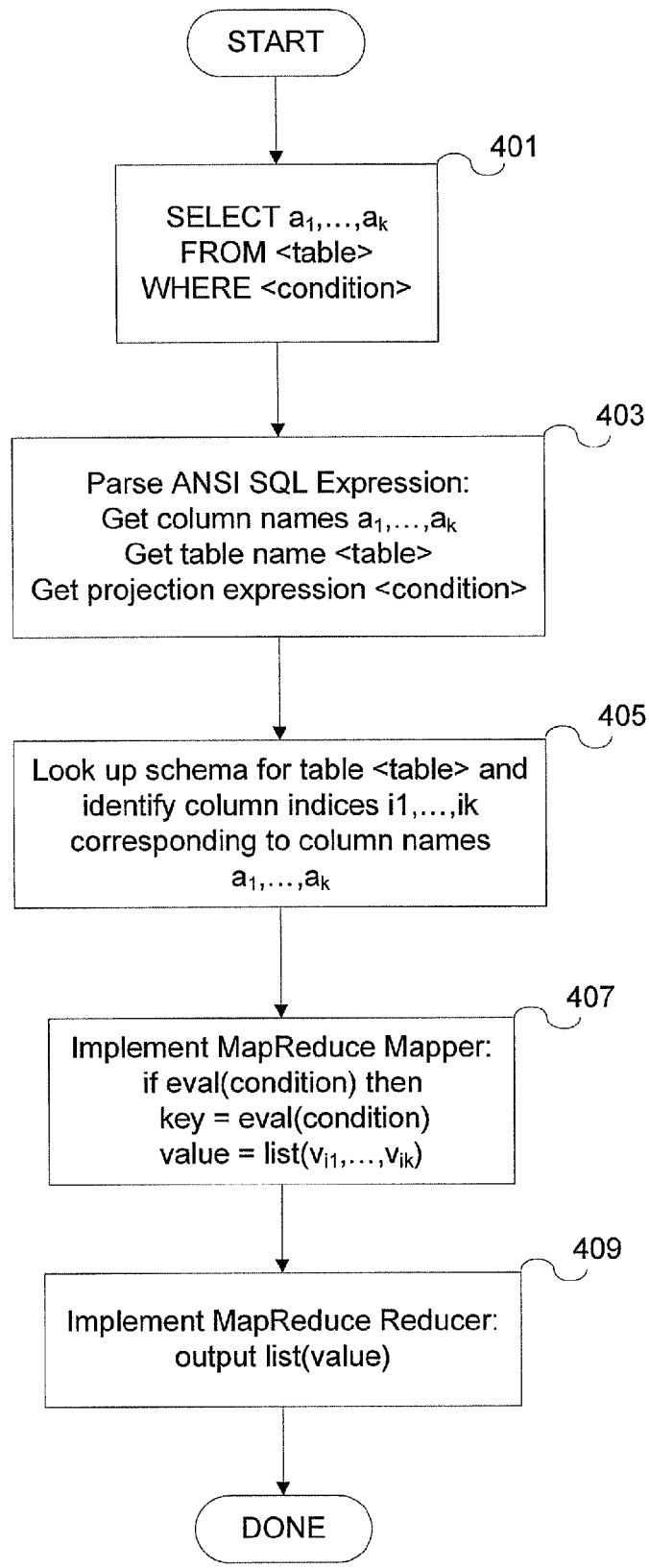
FIG. 4 is a flow chart illustrating an exemplary process for converting a select-where ANSI SQL query into a map-reduce program comprising one mapper program and one reducer program in accordance with one embodiment of the present invention.

FIG. 4 is a flow chart illustrating an exemplary process for converting a select-where ANSI SQL query into a map-reduce program comprising one mapper program and one reducer program in accordance with one embodiment of the present invention and is not intended to limit scope as one of ordinary skill would understand on review of this application that other configurations could be utilized without departing from the claimed invention. Although this figure depicts functional steps in a particular order and depicts a select-where ANSI SQL expression of a particular type, both for purposes of illustration, the process is not limited to this particular order or arrangement of steps, and nor is it limited to the specific form of the ANSI SQL expression. One skilled in the art will appreciate that the various steps portrayed in this figure could be rearranged, combined and/or adapted in various ways, and the ANSI SQL expression in this figure could be rewritten in various ways that are adherent to the ANSI standard.

Referring to FIG. 4, $a_1, \ldots, a_k$ denote one or more column names in a table <table> and <condition> denotes a predicate expression composed of column names and SQL operators. When a select-where ANSI SQL query arrives as input (401), the column names, the table name and the predicate expression are parsed (403). In parsing the predicate expression, the column names contained in that expression are parsed, the operators contained in that expression are parsed, and the expression is stored in postfix notation.

The column indices $i1, \ldots, ik$ corresponding to the columns $a_1, \ldots, a_k$ and the indices of any additional columns parsed from the predicate expression in step 403 are identified (405) using the schema corresponding to <table> created by the CREATE TABLE command when <table> was created. In step 407, the map-reduce mapper program is implemented in accordance to the following sequence of steps: if the predicate expression <condition> evaluates to 1 then (i) set the mapper key to 1; (ii) set the mapper value to the list of column values stored in column indices $i1, \ldots, ik$.

In step 409, the map-reduce reducer program is implemented by setting the output of the reducer to the list of values returned by the mappers.

Observe that there is only a single key with value 1 in the map-reduce program that converts the select-where ANSI SQL expression in FIG. 4. In another embodiment of the present invention, the map-reduce mapper program is implemented in accordance to the following sequence of steps: (i) set the mapper key to the evaluation of the predicate expression <condition>; and (ii) set the mapper value to the list of column values stored in column indices i1, . . . , ik In the same embodiment, the reducer program outputs the list of values returned by the mappers only when the key equals 1.

If the WHERE command and <condition> expression are not included in the SQL expression of FIG. 4 then the select-where expression becomes a simple select expression. The map-reduce mapper in step 407, is now implemented in accordance to the following sequence of steps: (i) set the mapper key to 1; and (ii) set the mapper value to the list of column values stored in column indices i1, . . . , ik.

If the columns in the SQL expression reference multiple tables, then one skilled in the art will appreciate that <table> refers to multiple table names each with its own schema that is used in step 405.

Figure 5A:
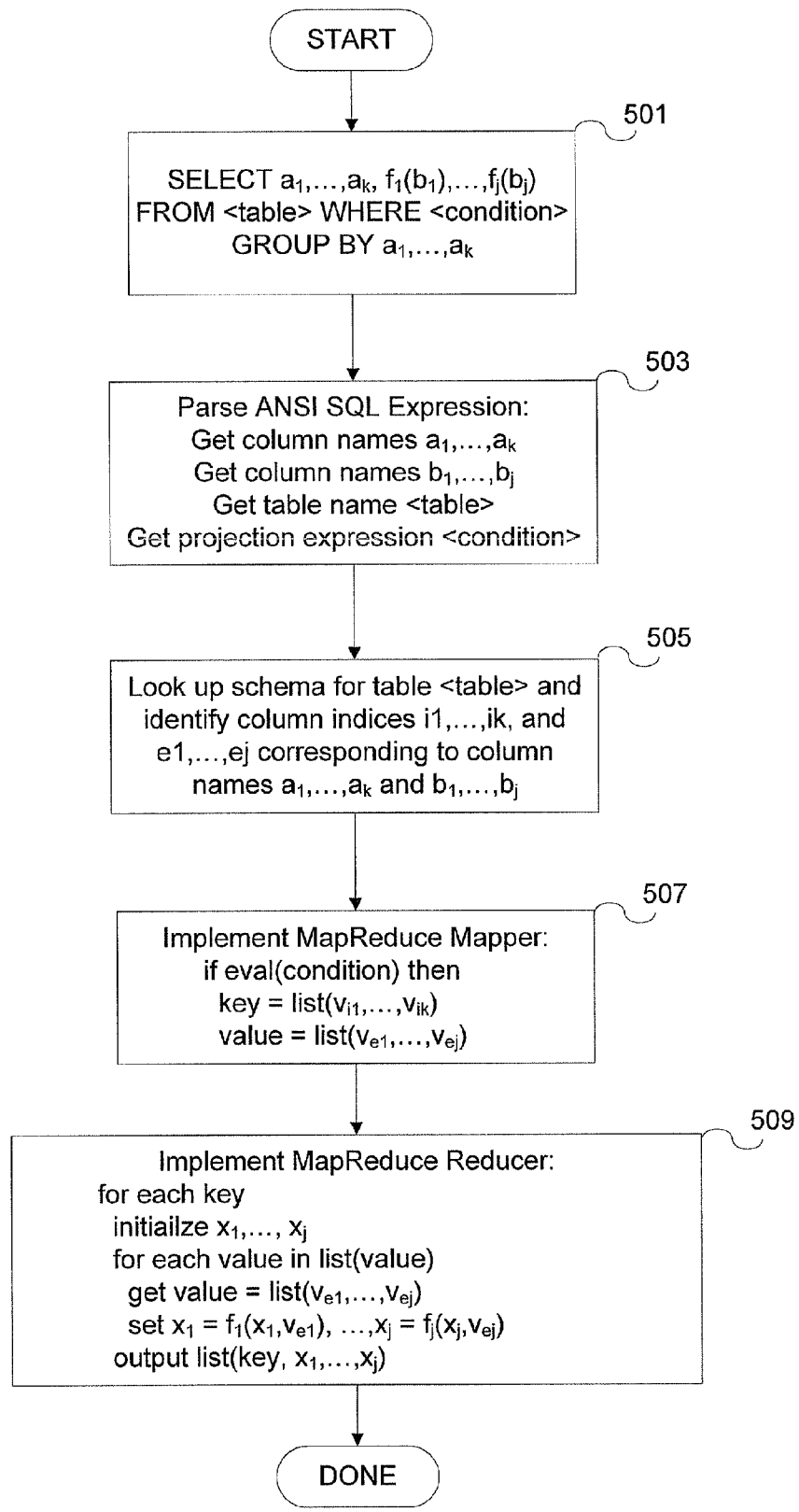
FIG. 5($a$) is a flow chart illustrating an exemplary process for converting an ANSI SQL query containing a GROUP BY command into a map-reduce program comprising one mapper program and one reducer program in accordance with one embodiment of the present invention.

FIG. 5(a) is a flow chart illustrating an exemplary process for converting an ANSI SQL query containing a GROUP BY command into a map-reduce program comprising one mapper program and one reducer program in accordance with one embodiment of the present invention and is not intended to limit scope as one of ordinary skill would understand on review of this application that other configurations could be utilized without departing from the claimed invention. Although this figure depicts functional steps in a particular order and depicts an ANSI SQL expression containing the GROUP BY command of a particular type, both for purposes of illustration, the process is not limited to this particular order or arrangement of steps, and nor is it limited to the particular type of ANSI SQL expression. One skilled in the art will appreciate that the various steps portrayed in this figure could be rearranged, combined and/or adapted in various ways, and the ANSI SQL expression in this figure could be rewritten in various ways that are adherent to the ANSI standard.

Referring to FIG. 5(a), (i) $a_1, \ldots, a_k$ denote one or more column names in a table <table> on which the GROUP BY command operates; (ii) $b_1, \ldots, b_j$ denote one or more column names in the table <table> on which the aggregate functions $f_1, \ldots, f_j$ operate; and (iii) and <condition> denotes a predicate expression composed of column names and SQL operators. The aggregate functions $f_1, \ldots, f_j$ are commutative and associative functions such as COUNT, SUM, PROD, MAX, MIN. Other functions such as AVG are computed by using SUM and COUNT.

When an ANSI SQL query arrives that contains a GROUP BY command as input (501), the column names corresponding to the GROUP BY command, the column names corresponding to the aggregate functions, the table name, and the predicate expression (if present as it is in this illustration) are parsed (503). In parsing the predicate expression, the column names contained in that expression are parsed, the operators contained in that expression are parsed, and the expression is stored in postfix notation.

The column indices i1, . . . , ik corresponding to the GROUP BY columns $a_1, \ldots, a_k$, the column indices e1, . . . , ej corresponding to the aggregation columns b1, . . . , $b_j$ and the indices of any additional columns parsed from the predicate expression in step 503 are identified (505) using the schema corresponding to <table> created by the CREATE TABLE command when <table> was created. In step 507, the map-reduce mapper program is implemented in accordance to the following sequence of steps: if the predicate expression <condition> evaluates to 1 then (i) set the mapper key to the list of column values stored in the GROUP BY columns indexed i1, . . . , ik;; and (ii) set the mapper value to the list of column values stored in aggregation column indices e1, . . . , ej.

Figure 5B:
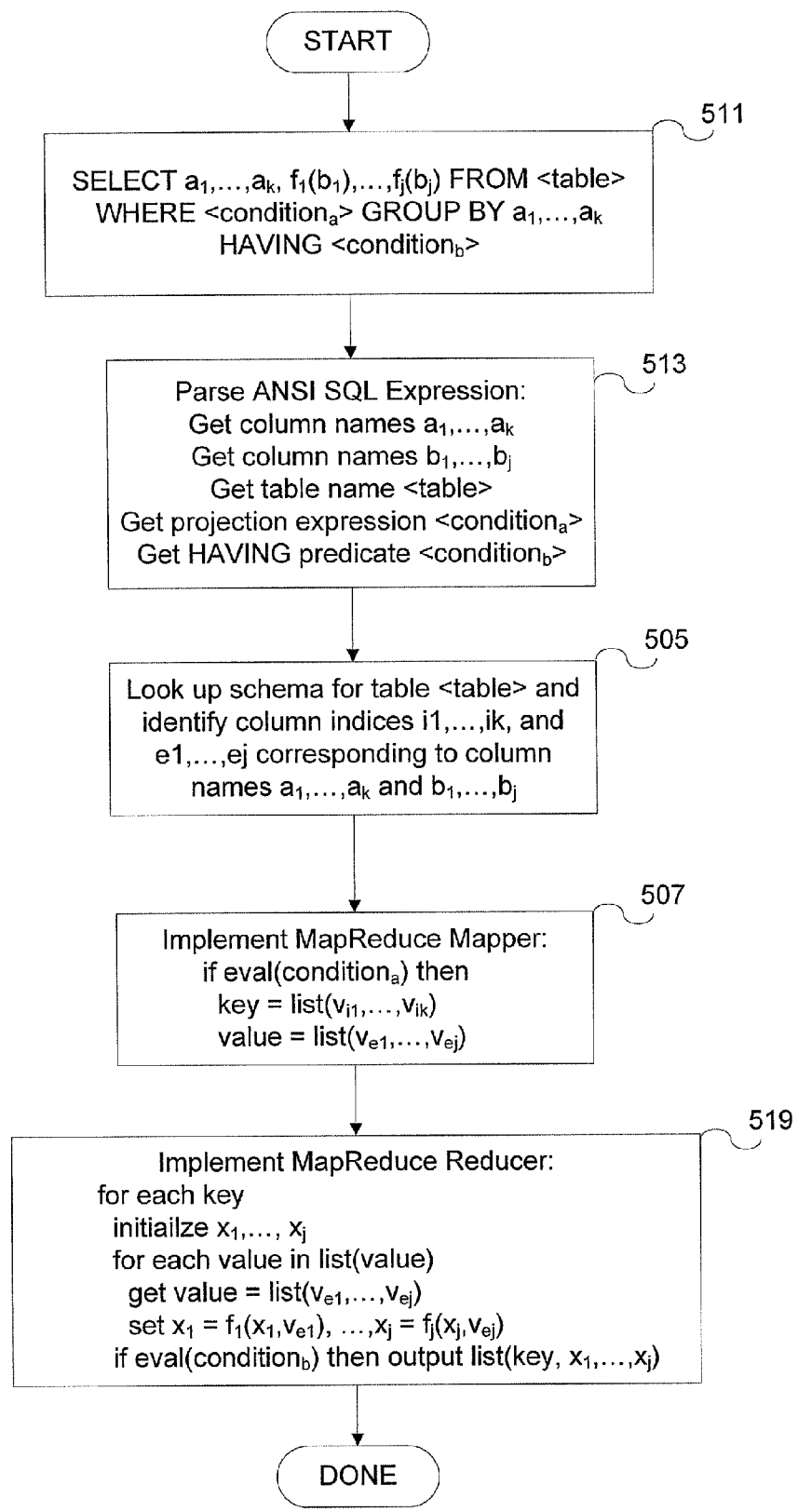

In step 509, the map-reduce reducer program is implemented in accordance to the following sequence of steps: for each key returned by the mapper program (i) initialize the values of the aggregate functions $f_1, \ldots, f_j$ to $x_1, \ldots, x_j$ where said initialization depends on the type of function as follows: for COUNT initialize to zero; for SUM initialize to zero; for PROD initialize to 1; for MAX initialize to the minimum machine integer or float in the system (depending on the column data type); for MIN initialize to the maximum machine integer or float in the system; (ii) for each value in the list of values returned by the mapper, get that value $(ve_1, \ldots, ve_j)$ corresponding to the column values in index positions e1, . . . , ej, and set the new values of the aggregate functions to $x_1=f_1(x_1, v_{e1}), \ldots, x_j=f_1(x_j, v_{ej})$; and (iii) after iterating over the entire list of values in (ii), output the current key together with the last computed values for $x_1, \ldots, x_j$ FIG. 5(b) is a flow chart illustrating an exemplary process for converting an ANSI SQL query containing a GROUP BY command and a HAVING command into a map-reduce program comprising one mapper program and one reducer program in accordance with one embodiment of the present invention and is not intended to limit scope as one of ordinary skill would understand on review of this application that other configurations could be utilized without departing from the claimed invention. Although this figure depicts functional steps in a particular order and depicts an ANSI SQL expression containing the GROUP BY and HAVING commands of a particular type, both for purposes of illustration, the process is not limited to this particular order or arrangement of steps, and nor is it limited to the particular type of ANSI SQL expression. One skilled in the art will appreciate that the various steps portrayed in this figure could be rearranged, combined and/or adapted in various ways, and the ANSI SQL expression in this figure could be rewritten in various ways that are adherent to the ANSI standard.

Referring to FIG. 5(b), (i) $a_1, \ldots, a_k$ denote one or more column names in a table <table> on which the GROUP BY command operates; (ii) $b_1, \ldots, b_k$ denote one or more column names in the table <table> on which the aggregate functions $f_1, \ldots, f_j$ operate; (iii) and <condition$_a$> denotes a predicate expression composed of column names and SQL operators; and (iv) <condition$_b$> denotes the predicate for the HAVING command.

When an ANSI SQL query arrives that contains GROUP BY and HAVING commands as input (511), the column names corresponding to the GROUP BY command, the column names corresponding to the aggregate functions, the table name, the predicate expression (if present as it is in this illustration), and the HAVING predicate are parsed (513). In parsing the predicate expression, the column names contained in that expression are parsed, the operators contained in that expression are parsed, and the expression is stored in postfix notation.

In step 519, the map-reduce reducer program is implemented in accordance to the following sequence of steps: for each key returned by the mapper program (i) initialize the values of the aggregate functions $f_1, \ldots, f_j$ to $x_1, \ldots, x_j$ where said initialization depends on the type of function as follows: for COUNT initialize to zero; for SUM initialize to zero; for PROD initialize to 1; for MAX initialize to the minimum machine integer in the system; for MIN initialize to the maximum machine integer in the system; (ii) for each value in the list of values returned by the mapper, get that value $(v_{e1}, \ldots, v_{ej})$ corresponding to the column values in index positions e1, . . . , ej and set the new values of the aggregate functions to $x_1=f_1(x_1, v_{e1}), \ldots, x_j=f_1(x_j,i_j)$; and (iii) after iterating over the entire list of values in (ii), if the HAVING predicate <condition$_b$> evaluates to TRUE then output the current key together with the last computed values for $x_1, \ldots, x_j$.

If the WHERE command and <condition> expression is not included in the SQL expression of FIG. 5(a) or FIG. 5(b), then one skilled in the art will appreciate that the map-reduce mapper in step 507 is now implemented in accordance to the following sequence of steps: (i) set the mapper key to the list of column values stored in the GROUP BY columns indexed i1, . . . , ik; and (ii) set the mapper value to the list of column values stored in aggregation column indices e1, . . . , ej.

If no aggregate functions are included in the SQL expression of FIG. 5(*a*), then the map-reduce mapper in step 507 is now implemented in accordance to the following sequence of steps: (i) set the mapper key to the list of column values stored in the GROUP BY columns indexed i1, . . . , ik;; and (ii) set the mapper value to 1. Furthermore, the map-reduce reducer in step 509 of FIG. 5(*a*) is now implemented in accordance to the following sequence of steps: for each key returned by the mapper program, output the key.

If the columns in the SQL expression reference multiple tables, then one skilled in the art will appreciate that <table> refers to multiple table names each with its own schema that is used in step 505.

The process in FIG. 5(*a*) for converting an ANSI SQL query containing a GROUP BY command into a map-reduce program can be used to convert an ANSI SQL query containing a DISTINCT command. One skilled in the art will appreciate that an ANSI SQL expression containing a DISTINCT command can be reduced to an expression that uses a GROUP BY command. For example, SELECT DISTINCT $a_1$, . . . , akFROM<table> is equivalent to the following SQL expression

SELECT a1, . . . , $a_k$ FROM <table> GROUP BY a1, . . . , $a_k$

Figure 6:
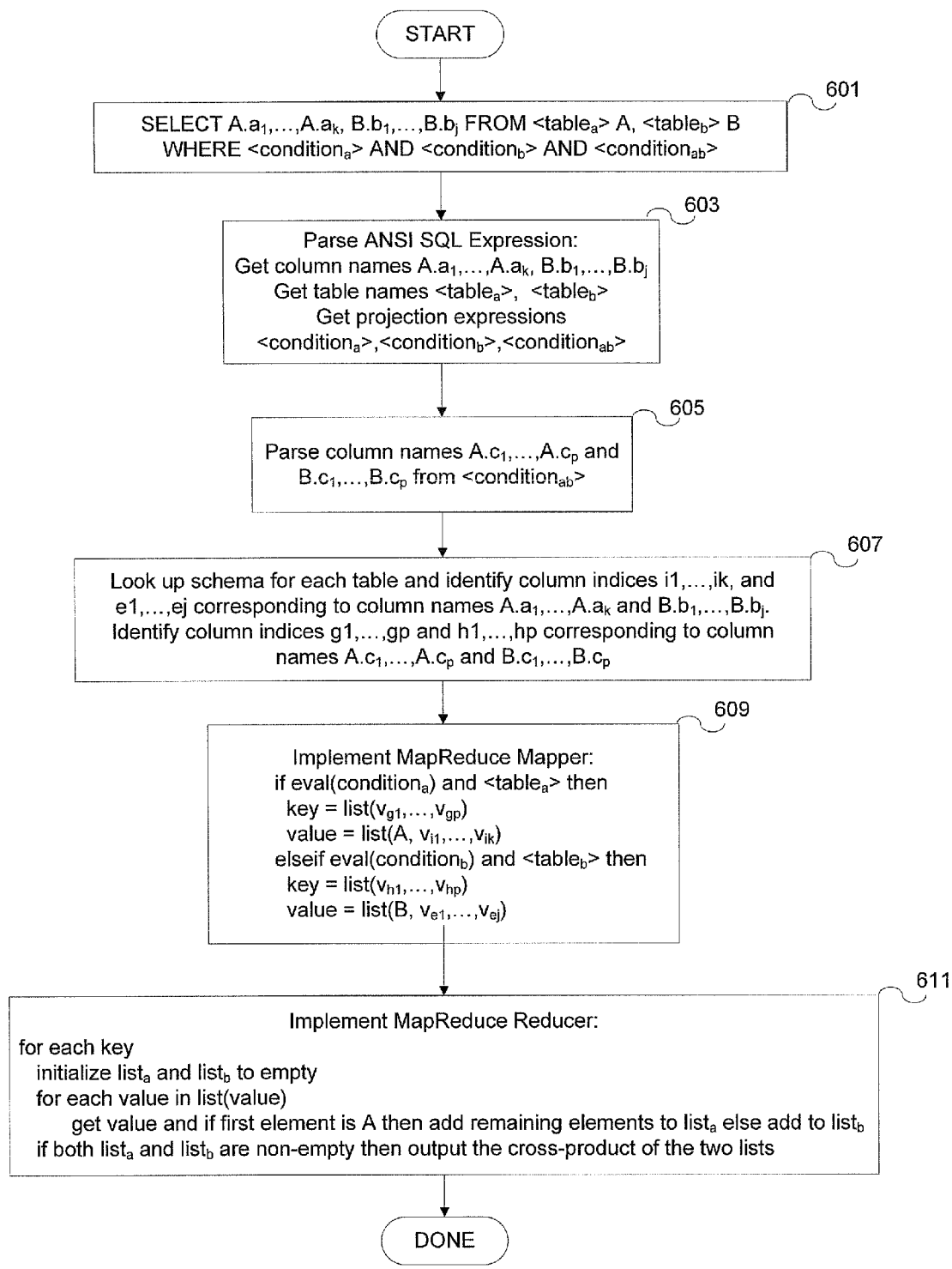
FIG. 6($a$) is a flow chart illustrating an exemplary process for converting an ANSI SQL query that performs an inner equi-join into a map-reduce program comprising one mapper program and one reducer program in accordance with one embodiment of the present invention.
Figure 6B:
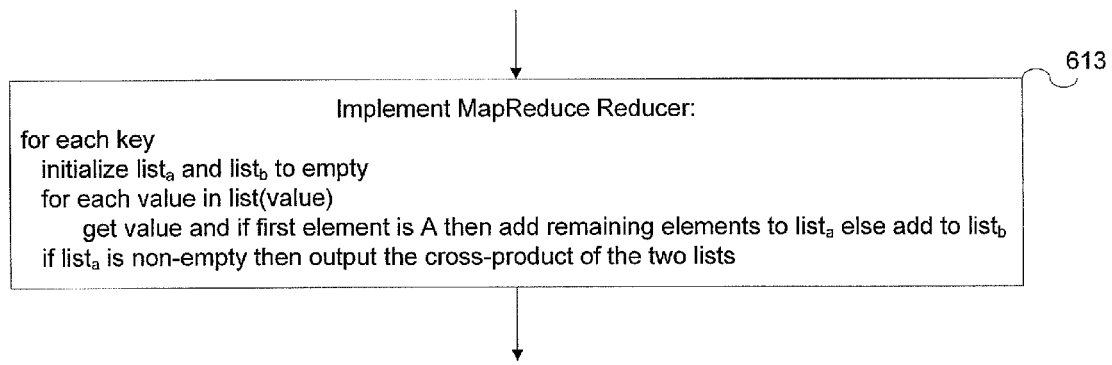
Figure 6C:
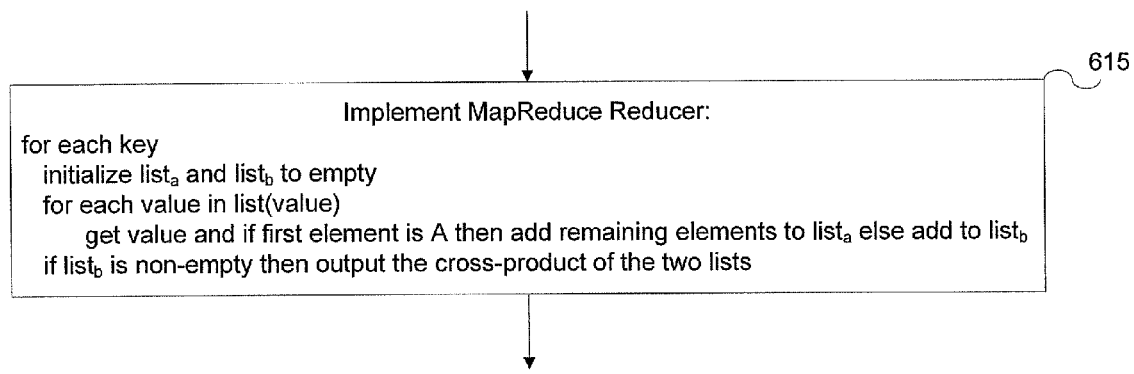
Figure 6D:
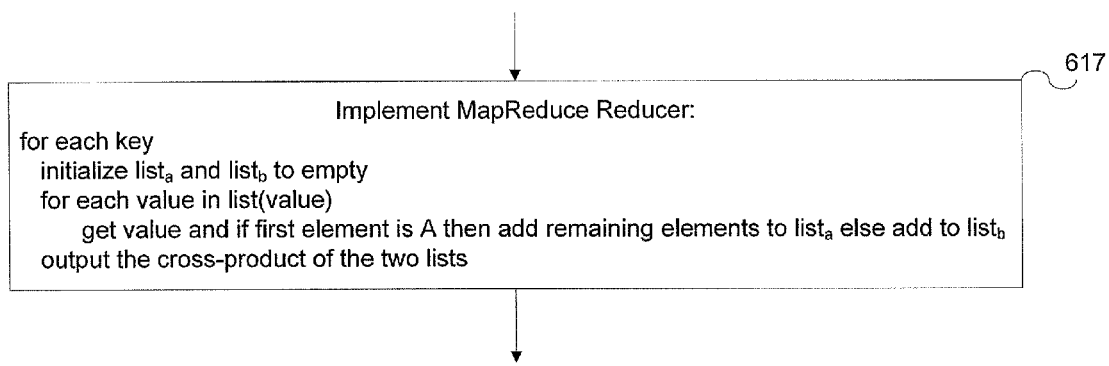

FIG. 6 is a flow chart illustrating an exemplary process for converting an ANSI SQL query that performs an inner equi-join into a map-reduce program comprising one mapper program and one reducer program in accordance with one embodiment of the present invention and is not intended to limit scope as one of ordinary skill would understand on review of this application that other configurations could be utilized without departing from the claimed invention. Although this figure depicts functional steps in a particular order and depicts an inner equi-join ANSI SQL expression of a particular type, both for purposes of illustration, the process is not limited to this particular order or arrangement of steps, and nor is it limited to the specific form of the ANSI SQL expression. One skilled in the art will appreciate that the various steps portrayed in this figure could be rearranged, combined and/or adapted in various ways, and the ANSI SQL expression in this figure could be rewritten in various ways that are adherent to the ANSI standard.

Referring to FIG. 6(*a*), A.$a_1$, . . . , A.$a_k$ denote one or more column names in a table <$table_a$>, B.$b_1$, . . . , B.$b_j$ denote one or more column names in a table <$table_b$>, <$condition_a$> denotes a predicate expression composed of column names from <$table_a$>, <$condition_b$> denotes a predicate expression composed of column names from <$table_b$>, and <$condition_{ab}$> denotes an equi-join predicate expression composed of column names from <$table_a$> and <$table_b$>. When an equi-join ANSI SQL query arrives as input (601), the column names, the table names, and the predicate expressions are parsed (603). In parsing the predicate expressions, the column names contained in that expression are parsed, the operators contained in that expression are parsed, and the expression is stored in postfix notation. Of special interest for this flow chart is the parsing of the column names A.$c_1$, . . . , A.$c_p$ in <$table_a$> and B.$c_1$, . . . , B.$c_p$ in <$table_b$> that are in the equi-join expression <$condition_{ab}$> (605).

The column indices i1, . . . , ik corresponding to the columns A.$a_1$, . . . , A.ak, the column indices e1, . . . , ej corresponding to the columns B.$b_1$, . . . , B.bj, the column indices g1, . . . , gp corresponding to the columns A.$c_1$, . . . , A.cp, the column indices h1, . . . , hp corresponding to the columns B.$c_1$, . . . , B.cp, and the indices of any additional columns parsed from the predicate expressions <$condition_a$> and <$condition_b$> in step 603 are identified (607) using the schemas corresponding to tables <$table_a$> and <$table_b$> created by the CREATE TABLE command.

In step 609, the map-reduce mapper program is implemented in accordance to the following sequence of steps: if in processing <$table_a$> the predicate expression <$condition_a$> evaluates to 1 then (i) set the mapper key to the list of table A column values at indices g1, . . . , gp; (ii) set the mapper value to the list of column values stored in column indices i1, . . . , ik and pre-pend the table alias A; else if in processing <$table_b$> the predicate expression <$condition_b$> evaluates to 1 then (i) set the mapper key to the list of table B column values at indices h1, . . . , hp; (ii) set the mapper value to the list of column values stored in column indices e1, . . . , ej and pre-pend the table alias B.

In step 611, the map-reduce reducer program is implemented in accordance to the following sequence of steps: for each key returned by the mapper program (i) initialize lists $list_a$ and $list_b$ to empty; (ii) for each value in the list of values returned by the mapper, read the first token and if it matches A then add the remaining elements in the value to $list_a$, else add them to $list_b$; (iii) after iterating over the entire list of values in (ii), if both $list_a$, and $list_b$ are not empty then output the cross-product of these two lists.

One skilled in the art will appreciate that neither <$condition_a$> nor <$condition_b$> are necessary in the input expression in step 601 to define an equi-join. If either of both of these are missing, the map-reduce mapper in step 609 is implemented accordingly. For example, if <$condition_a$> is absent, the map-reduce mapper is now implemented in accordance to the following sequence of steps: in processing <$table_a$> (i) set the mapper key to the list of table A column values at indices g1, . . . , gp; (ii) set the mapper value to the list of column values stored in column indices i1, . . . , ik and pre-pend the table alias A; else if in processing <$table_b$> the predicate expression <$condition_b$> evaluates to 1 then (i) set the mapper key to the list of table B column values at indices h1, . . . , hp; (ii) set the mapper value to the list of column values stored in column indices e1, . . . , ej and pre-pend the table alias B.

The process illustrated in FIG. 6(*a*) enables the input SQL expression to represent a self-join by using table aliases in the expression. Replacing a nested query by a self-join query has better execution performance because it only needs to run a single MapReduce job rather than separate jobs for each nested query.

A SQL expression for a left outer equi-join over two tables is implemented as illustrated in FIG. 6(*a*) with the map-reduce reducer program in step 611 implemented in accordance to the following sequence of steps illustrated in FIG. 6(*b*) step 613: for each key returned by the mapper program (i) initialize lists $list_a$, and $list_b$ to empty; (ii) for each value in the list of values returned by the mapper, read the first token and if it matches A then add the remaining elements in the value to $list_a$, else add them to $list_b$; (iii) after iterating over the entire list of values in (ii), if $list_a$, is non-empty then output the cross-product of these two lists.

A SQL expression for a right outer equi-join over two tables is implemented as illustrated in FIG. 6(*a*) with the map-reduce reducer program in step 611 implemented in accordance to the following sequence of steps illustrated in FIG. 6(*c*) step 615: for each key returned by the mapper program (i) initialize lists $list_a$, and $list_b$ to empty; (ii) for each value in the list of values returned by the mapper, read the first token and if it matches A then add the remaining elements in the value to $list_a$, else add them to $list_b$; (iii) after iterating over the entire list of values in (ii), if $list_b$ is non-empty then output the cross-product of these two lists.

A SQL expression for a full outer equi-join over two tables is implemented as illustrated in FIG. 6(*a*) with the mapreduce reducer program in step 611 implemented in accordance to the following sequence of steps illustrated in FIG. 6(*d*) step 617: for each key returned by the mapper program (i) initialize lists $list_a$ and $list_b$ to empty; (ii) for each value in the list of values returned by the mapper, read the first token and if it matches A then add the remaining elements in the value to $list_a$, else add them to $list_b$; (iii) after iterating over the entire list of values in (ii) output the cross-product of these two lists.

One skilled in the art will appreciate that a SQL expression for equi-joins (inner or any of the outer) over three or more tables can be reduced to a nested SQL expression where each nested expression is an (inner, left-outer, right-outer, or full-outer) equi-join over two tables and can be implemented by one of the processes illustrated in FIGS. 6(*a*)-(*d*).

The equi-join SQL expression in step 601 is in the "implicit join notation". One skilled in the art will appreciate that an equi-join expression in the "explicit join notation" that uses one of the following ANSI SQL command JOIN <table> ON, INNER JOIN <table> ON, LEFT JOIN <table> ON, RIGHT JOIN <table> ON, FULL JOIN <table> ON to express an inner join, left-outer join, right-outer join, or full join can be implemented by one of the processes illustrated in FIG. 6(*a*)-(*d*).

Figure 7:
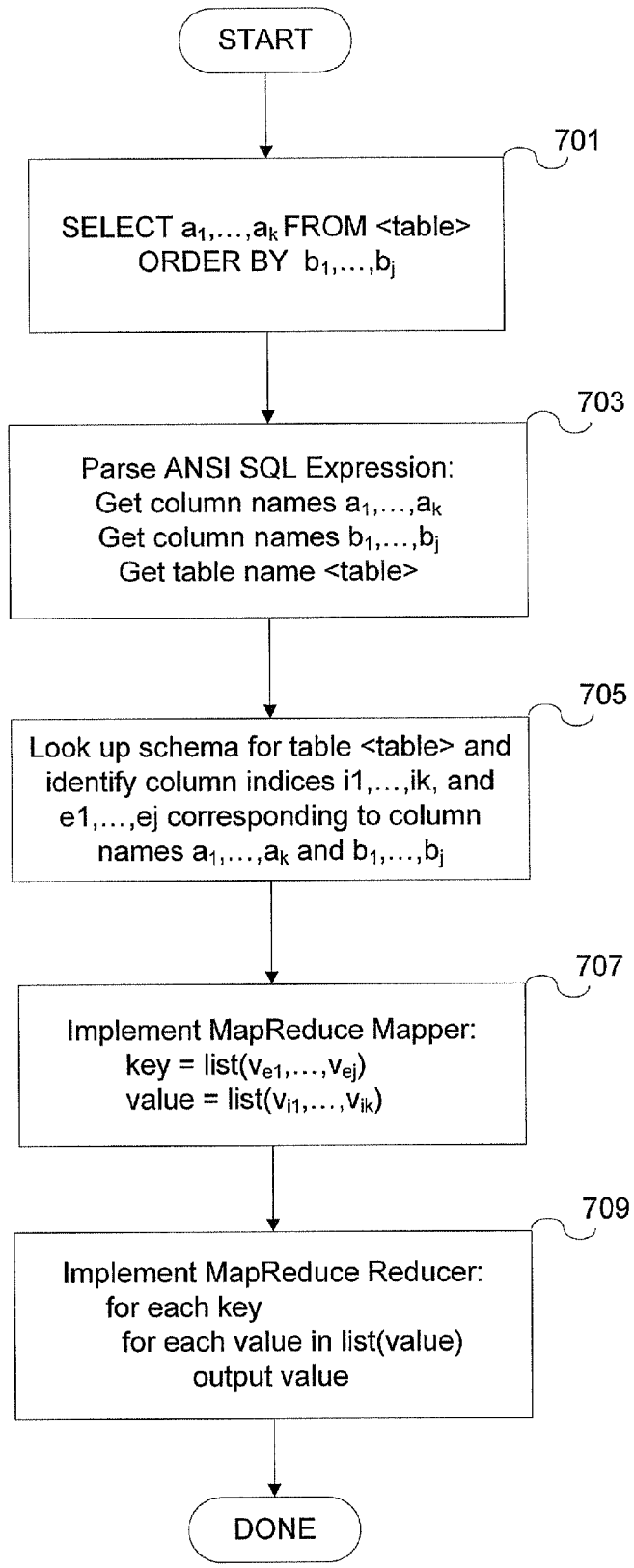
FIG. 7 is a flow chart illustrating an exemplary process for converting an ANSI SQL query containing an ORDER BY command into a map-reduce program comprising one mapper program and one reducer program in accordance with one embodiment of the present invention.

FIG. 7 is a flow chart illustrating an exemplary process for converting an ANSI SQL query containing an ORDER BY command into a map-reduce program comprising one mapper program and one reducer program in accordance with one embodiment of the present invention and is not intended to limit scope as one of ordinary skill would understand on review of this application that other configurations could be utilized without departing from the claimed invention. Although this figure depicts functional steps in a particular order and depicts an ANSI SQL expression containing the ORDER BY command of a particular type, both for purposes of illustration, the process is not limited to this particular order or arrangement of steps, and nor is it limited to the particular type of ANSI SQL expression. One skilled in the art will appreciate that the various steps portrayed in this figure could be rearranged, combined and/or adapted in various ways, and the ANSI SQL expression in this figure could be rewritten in various ways that are adherent to the ANSI standard.

Referring to FIG. 7, (i) $a_i, \ldots, a_k$ denote one or more column names in a table <table> on which the SELECT command operates; and (ii) $b_i, \ldots, b_j$ denote one or more column names in the table <table> on which the ORDER BY command operates.

When an ANSI SQL query arrives that contains a ORDER BY command as input (701), the column names corresponding to the SELECT command and the column names corresponding to the ORDER BY command are parsed (703).

The column indices $i1, \ldots, ik$ corresponding to the columns $a_i, \ldots, a_k$ and the column indices $e1, \ldots, ej$ corresponding to the ORDER BY command parsed in step 603 are identified (705) using the schema corresponding to <table> created by the CREATE TABLE command when <table> was created. In step 707, the map-reduce mapper program is implemented in accordance to the following sequence of steps: (i) set the mapper key to the list of column values stored in the ORDER BY columns indexed $i1, \ldots, ik$; (ii) set the mapper value to the list of column values stored in the column indices $e1, \ldots, ej$.

In step 709, the map-reduce reducer program is implemented in accordance to the following sequence of steps: for each key returned by the mapper program and for each value in the list of values returned by the mapper, output the value.

Figure 8:
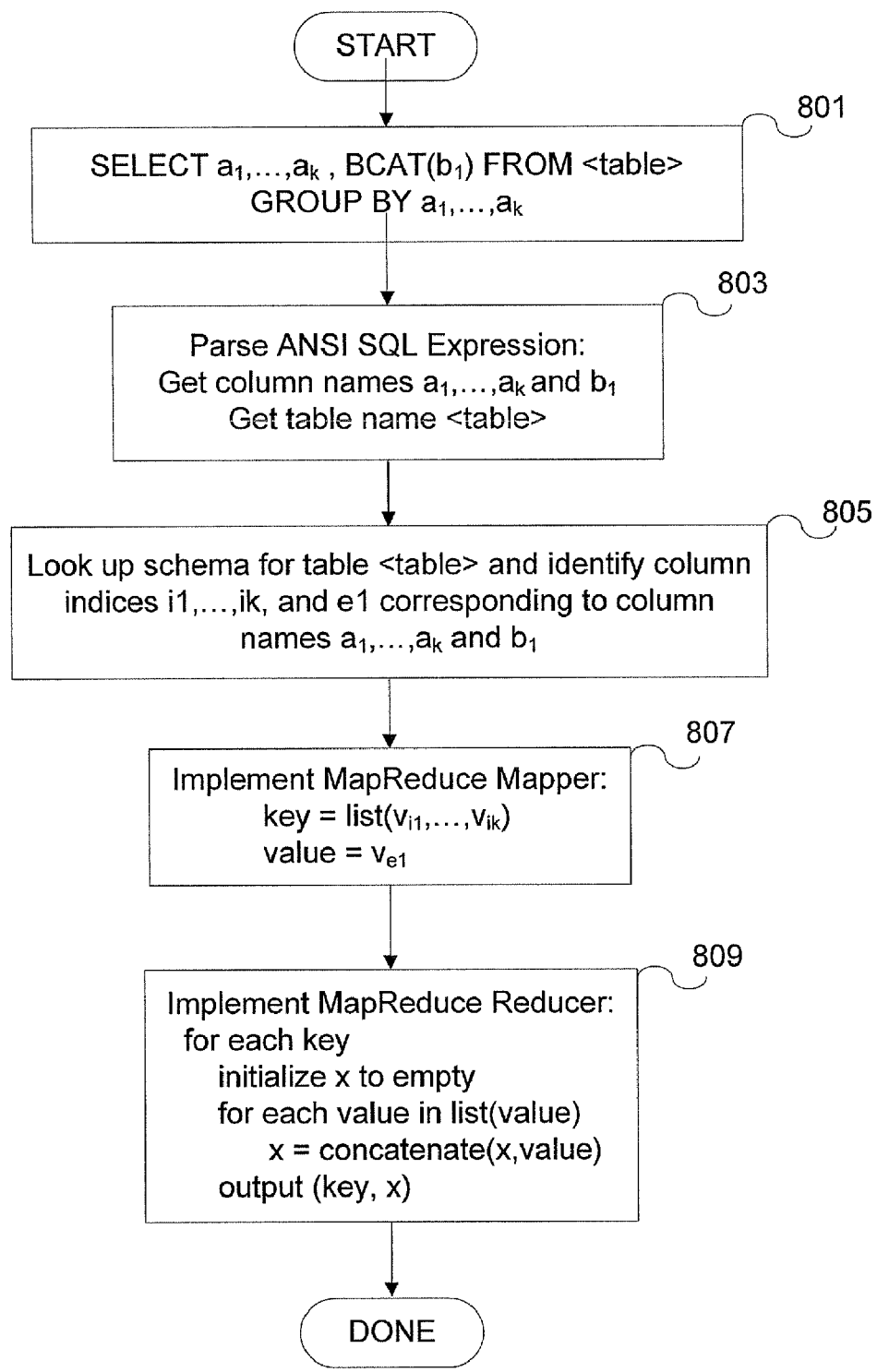
FIG. 8 is a flow chart illustrating an exemplary process for converting the BCAT aggregation operator into a map-reduce program comprising two mapper programs and two reducer programs in accordance with one embodiment of the present invention.

FIG. 8 is a flow chart illustrating an exemplary process for converting the BCAT aggregate operator into a map-reduce program comprising two mapper programs and two reducer programs in accordance with one embodiment of the present invention and is not intended to limit scope as one of ordinary skill would understand on review of this application that other configurations could be utilized without departing from the claimed invention. Although this figure depicts functional steps in a particular order and depicts an ANSI SQL expression containing the BCAT operator of a particular type, both for purposes of illustration, the process is not limited to this particular order or arrangement of steps, and nor is it limited to the particular type of ANSI SQL expression. One skilled in the art will appreciate that the various steps portrayed in this figure could be rearranged, combined and/or adapted in various ways, and the ANSI SQL expression in this figure could be rewritten in various ways that are adherent to the ANSI standard.

Referring to FIG. 8, (i) $a_i, \ldots, ak$ denote one or more column names in a table <table> on which the BCAT command operates; (ii) $b_i$ denote a column name in the table <table> on which the aggregate function BCAT operates.

When an ANSI SQL query arrives that contains a BCAT command as input (801), the column names corresponding to the GROUP BY command, the column name corresponding to the BCAT aggregate function, and the table name are parsed (803).

The column indices $i1, \ldots, ik$ corresponding to the GROUP BY columns $a_1, \ldots, a_k$ and the column index $e1$ corresponding to the aggregation column $b_1$ are identified (805) using the schema corresponding to <table> created by the CREATE TABLE command when <table> was created. In step 807, the map-reduce mapper program is implemented in accordance to the following sequence of steps: (i) set the mapper key to the list of column values stored in the GROUP BY columns indexed $i1, \ldots, ik$, (ii) set the mapper value to the list of column values stored in aggregation column indices $e1$.

In step 809, the map-reduce reducer program is implemented in accordance to the following sequence of steps: for each key returned by the mapper program (i) initialize the value x of the aggregate function BCAT to the empty set; (ii) for each value in the list of values returned by the mapper, get that value $v_{e1}$, corresponding to the column value in index position $e1$ and append (or concatenate) it to x; (iii) after iterating over the entire list of values in (ii), output x and the current key.

One skilled in the art will appreciate that the a SQL expression that contains two or more aggregate functions, with one or more such functions of the type BCAT is within the scope of the invention. The particular embodiment of the invention illustrated by FIG. 8 is set forth without any loss of generality to, and without imposing limitations upon, the claimed invention.

Example: Please note the following example, which is intended to illustrate one mode of operation of the present invention but is in no way intended to limit the scope of the present invention.

Example NWSearchLogs table—

| Column name | Data Type |
|---|---|
| Header | VARCHAR |
| SearchString | VARCHAR |
| Listings | INT |
| PartnerID | VARCHAR |
| Date | DATETIME format 'MM/dd/yy' |
| ListingID | BIGINT |
| NWUUID | VARCHAR |

Column delimiter- '|'

A sample (20 records) of network search log file that constitute the contents of NWSearchLogs table is shown below:

INFO - search|computer repair|4|6547316|05/31/08|002344458|nwuuid-6547316-268AEB49-7654-8924-6EC9-880419BFEF02-ym
INFO - search|moving vehicles|3|6547318|05/31/08|010043286|nwuuid-6547318-7970219D-CAD6-9779-582E-5E87BE116E0-ym
INFO - search|private equity|3|ft1|05/31/08|000000036|nwuuid-ft1-5D5C5751-DF3B-607D-CD92-C1E7E060DDB1-ym
INFO - search|trailer rentals|6|6547318|05/31/08|000000692|nwuuid-6547318-B77BF70D-90D9-65F1-D551-D08F8F980CAA-ym
INFO - search|computer repair|4|6547316|05/31/08|000033286|nwuuid-6547316-7F2DD98C-0703-5A2D-9BA2-DAE15CDD3D77-ym
INFO - search|email marketing|1|7001200|05/31/08|000000817|nwuuid-7001200-B51E5788-32EF-807F-DB26-EF42CA7DC35D-ym
INFO - search|private equity|6|8559099|05/31/08|000000942|nwuuid-8559099-A0841A51-0820-55B7-6B5D-371F08ED3D10-ym
INFO - search|computer repair|1|6547316|05/31/08|000001130|nwuuid-6547316-A7444F37-A16C-6D29-3DE7-7FBB5D14A766-ym
INFO - search|medical clinics|2|6547316|05/30/08|000001599|nwuuid-6547316-9721EBC1-2700-3F75-800B-601B708B4090-ym
INFO - search|private equity|3|ft1|05/30/08|002002099|nwuuid-ft1-AC335881-2738-A707-D88C-D22184331D77-ym
INFO - search|private equity|3|ft1|05/31/08|002002099|nwuuid-ft1-AC335881-2738-A707-D88C-D22184331D77-ym
INFO - search|email marketing|1|7001200|05/31/08|000015880|nwuuid-7001200-F1DCE080-C4A8-C3C7-1E46-0F2B490399C2-ym
INFO - search|blue tooth|1|8559099|05/31/08|000001802|nwuuid-8559099-9E13356C-3635-A631-96A3-249EFED9F855-ym
INFO - search|dedicated server hosting|1|7001200|05/31/08|000002989|nwuuid-7001200-D0EDDBDF-A47D-88BB-01C7-159AC3549FB6-ym
INFO - search|blue tooth|1|8559099|05/31/08|000001802|nwuuid-8559099-9E13356C-3635-A631-96A3-249EFED9F855-ym
INFO - search|private equity|3|ft1|05/30/08|002002099|nwuuid-ft1-AC335881-2738-A707-D88C-D22184331D77-ym
INFO - search|dedicated server hosting|1|7001200|05/31/08|000003630|nwuuid-7001200-C781224A-3574-B559-8985-26167DBF4EA4-ym
INFO - search|financial planning|10|6547318|05/31/08|000003864|nwuuid-6547318-CC031E3C-9ED7-1778-2A3A-58B2F6C3EBD4-ym
INFO - search|email|8|internet|05/30/08|000003942|nwuuid-internet-BAD13AE6-B90B-E015-013A-9B91911358B0-ym
INFO - search|wireless network|6|8559099|05/30/08|000004036|nwuuid-8559099-BC244F67-890D-0866-6D75-645EA8FB4D6B-ym Problem Description: Find all the distinct search strings used by users on May 31, 2008 from network search logs.
Input ANSI SQL Command:
SELECT DISTINCT SearchString FROM NWSearchLogs WHERE date='May 31, 2008'

Example log file contains 20 records as shown above which is stored as two files of 10 records each in a distributed file system. In this illustration, the present invention is configured with 2 mapper-slave processes and two reducer-slave processes.

| Mapper 1<br>Input Records: 10 | Mapper 2<br>Input Records: 10 |
|---|---|
| INFO - search|computer repair|4|6547316|05/31/08|002344458|nwuuid-6547316-268AEB49-7654-8924-6EC9-880419BFEF02-ym<br>INFO - search|moving vehicles|3|6547318|05/31/08|010043286|nwuuid-6547318-7970219D-CAD6-9779-582E-5E87BE116CE0-ym<br>INFO - search|private equity|3|ft1|05/31/08|000000036|nwuuid-ft1-5D5C5751-DF3B-607D-CD92-C1E7E060DDB1-ym<br>INFO - search|trailer rentals|6|6547318|05/31/08|000000692|nwuuid-6547318-B77BF70D-90D9-65F1-D551-D08F8F980CAA-ym<br>INFO - search|computer repair|4|6547316|05/31/08|000033286|nwuuid-6547316-7F2DD98C-0703-5A2D-9BA2-DAE15CDD3D77-ym | INFO - search|private equity|3|ft1|05/31/08|002002099|nwuuid-ft1-AC335881-2738-A707-D88C-D22184331D77-ym<br>INFO - search|email marketing|1|7001200|05/31/08|000015880|nwuuid-7001200-F1DCE080-C4A8-C3C7-1E46-0F2B490399C2-ym<br>INFO - search|blue tooth|1|8559099|05/31/08|000001802|nwuuid-8559099-9E13356C-3635-A631-96A3-249EFED9F855-ym<br>INFO - search|dedicated server hosting|1|7001200|05/31/08|000002989|nwuuid-7001200-D0EDDBDF-A47D-88BB-01C7-159AC3549FB6-ym<br>INFO - search|blue tooth|1|8559099|05/31/08|000001802|nwuuid-8559099-9E13356C-3635-A631-96A3-249EFED9F855-ym<br>INFO - search|private equity|3|ft1|05/30/08|002002099|nwuuid-ft1-AC335881-2738-A707-D88C-D22184331D77-ym<br>INFO - search|dedicated server |

-continued

| | |
|---|---|
| INFO - search\|email marketing\|1\|7001200\|05/31/08\|000000817\|nwuuid-7001200-B51E5788-32EF-807F-DB26-EF42CA7DC35D-ym<br>INFO - search\|private Equity\|6\|8559099\|05/31/08\|000000942\|nwuuid-8559099-A0841A51-0820-55B7-6B5D-371F08ED3D10-ym<br>INFO - search\|computer repair\|1\|6547316\|05/31/08\|000001130\|nwuuid-6547316-A7444F37-A16C-6D29-3DE7-7FBB5D14A766-ym<br>INFO - search\|medical clinics\|2\|6547316\|05/30/08\|000001599\|nwuuid-6547316-9721EBC1-2700-3F75-800B-601B708B4090-ym<br>INFO - search\|private Equity\|3\|ft1\|05/30/08\|002002099\|nwuuid-ft1-AC335881-2738-A707-D88C-D22184331D77-ym | hosting\|1\|7001200\|05/31/08\|000003630\|nwuuid-7001200-C781224A-3574-B559-8985-26167DBF4EA4-ym<br>INFO - search\|financial planning\|10\|6547318\|05/31/08\|000003864\|nwuuid-6547318-CC031E3C-9ED7-1778-2A3A-58B2F6C3EBD4-ym<br>INFO - search\|email\|8\|internet\|05/30/08\|000003942\|nwuuid-internet-BAD13AE6-B90B-E015-013A-9B91911358B0-ym<br>INFO - search\|wireless network\|6\|8559099\|05/30/08\|000004036\|nwuuid-8559099-BC244F67-890D-0866-6D75-645EA8FB4D6B-ym |
| Filter Records<br>using WHERE clause | Filter Records<br>using WHERE clause |
| INFO - search\|computer repair\|4\|6547316\|05/31/08\|002344458\|nwuuid-6547316-268AEB49-7654-8924-6EC9-880419BFEF02-ym<br>INFO - search\|moving vehicles\|3\|6547318\|05/31/08\|010043286\|nwuuid-6547318-7970219D-CAD6-9779-582E-5E87BE116CE0-ym<br>INFO - search\|private equity\|3\|ft1\|05/31/08\|000000036\|nwuuid-ft1-5D5C5751-DF3B-607D-CD92-C1E7E060DDB1-ym<br>INFO - search\|trailer rentals\|6\|6547318\|05/31/08\|000000692\|nwuuid-6547318-B77BF70D-90D9-65F1-D551-D08F8F980CAA-ym<br>INFO - search\|computer repair\|4\|6547316\|05/31/08\|000033286\|nwuuid-6547316-7F2DD98C-0703-5A2D-9BA2-DAE15CDD3D77-ym<br>INFO - search\|email marketing\|1\|7001200\|05/31/08\|000000817\|nwuuid-7001200-B51E5788-32EF-807F-DB26-EF42CA7DC35D-ym<br>INFO - search\|private equity\|6\|8559099\|05/31/08\|000000942\|nwuuid-8559099-A0841A51-0820-55B7-6B5D-371F08ED3D10-ym<br>INFO - search\|computer repair\|1\|6547316\|05/31/08\|000001130\|nwuuid-6547316-A7444F37-A16C-6D29-3DE7-7FBB5D14A766-ym | INFO - search\|private equity\|3\|ft1\|05/31/08\|002002099\|nwuuid-ft1-AC335881-2738-A707-D88C-D22184331D77-ym<br>INFO - search\|email marketing\|1\|7001200\|05/31/08\|000015880\|nwuuid-7001200-F1DCE080-C4A8-C3C7-1E46-0F2B490399C2-ym<br>INFO - search\|blue tooth\|1\|8559099\|05/31/08\|000001802\|nwuuid-8559099-9E13356C-3635-A631-96A3-249EFED9F855-ym<br>INFO - search\|dedicated server hosting\|1\|7001200\|05/31/08\|000002989\|nwuuid-7001200-D0EDDBDF-A47D-88BB-01C7-159AC3549FB6-ym<br>INFO - search\|blue tooth\|1\|8559099\|05/31/08\|000001802\|nwuuid-8559099-9E13356C-3635-A631-96A3-249EFED9F855-ym<br>INFO - search\|private equity\|3\|ft1\|05/30/08\|002002099\|nwuuid-ft1-AC335881-2738-A707-D88C-D22184331D77-ym<br>INFO - search\|dedicated server hosting\|1\|7001200\|05/31/08\|000003630\|nwuuid-7001200-C781224A-3574-B559-8985-26167DBF4EA4-ym<br>INFO - search\|financial planning\|10\|6547318\|05/31/08\|000003864\|nwuuid-6547318-CC031E3C-9ED7-1778-2A3A-58B2F6C3EBD4-ym |

| Output (Key, Value) pairs<br>Mapper 1<br>(Key, Value) pairs | | Output (Key, Value) pairs<br>Mapper 2<br>(Key, Value) pairs | |
|---|---|---|---|
| Key | Value | Key | Value |
| computer repair | 1 | private equity | 1 |
| moving vehicles | 1 | email marketing | 1 |
| private equity | 1 | blue tooth | 1 |
| trailer rentals | 1 | dedicated server hosting | 1 |
| computer repair | 1 | blue tooth | 1 |
| email marketing | 1 | private equity | 1 |
| private equity | 1 | dedicated server hosting | 1 |
| computer repair | 1 | financial planning | 1 |

Value fields is irrelevant here, so outputting 1

| Reducer 1 | | Reducer 2 | |
|---|---|---|---|
| Key | List of Values | Key | List of Values |
| computer repair | [1, 1, 1] | private equity | [1, 1] |
| moving vehicles | [1] | email marketing | [1] |

-continued

| | | | |
|---|---|---|---|
| private equity | [1, 1] | blue tooth | [1, 1] |
| trailer rentals | [1] | dedicated server hosting | [1, 1] |
| email marketing | [1] | financial planning | [1] |

| Output (Key, Value) pairs | | Output (Key, Value) pairs | |
|---|---|---|---|
| Key | Value | Key | Value |
| computer repair | 1 | private equity | 1 |
| moving vehicles | 1 | email marketing | 1 |
| private equity | 1 | blue tooth | 1 |
| trailer rentals | 1 | dedicated server hosting | 1 |
| email marketing | 1 | financial planning | 1 |

| Sort on Keys | | Sort on Keys | |
|---|---|---|---|
| Key | Value | Key | Value |
| computer repair | 1 | blue tooth | 1 |
| email marketing | 1 | dedicated server hosting | 1 |
| moving vehicles | 1 | email marketing | 1 |
| private equity | 1 | financial planning | 1 |
| trailer rentals | 1 | private equity | 1 |

| Reducer(s) | |
|---|---|
| Key | List of Values |
| blue tooth | [1] |
| computer repair | [1] |
| dedicated server hosting | [1] |
| email marketing | [1, 1] |
| financial planning | [1] |
| moving vehicles | [1] |
| private equity | [1, 1] |
| trailer rentals | [1] |

| Output (Key, Value) pairs | |
|---|---|
| Key | Value |
| blue tooth | NULL |
| computer repair | NULL |
| dedicated server hosting | NULL |
| email marketing | NULL |
| financial planning | NULL |
| moving vehicles | NULL |
| private equity | NULL |
| trailer rentals | NULL |

| Output file |
|---|
| blue tooth |
| computer repair |
| dedicated server hosting |
| email marketing |
| financial planning |
| moving vehicles |
| private equity |
| trailer rentals |

We claim:

1. A computer implemented method for executing an ANSI SQL expression belonging to the SELECT-WHERE-equi-JOIN class on data residing in a distributed file system, said method comprising the steps of:
    entering the ANSI SQL expression into a user interface;
    converting the ANSI SQL expression into a map-reduce program;
    running the map-reduce program on the distributed file system;
    storing the result set of the program in the distributed file system; and
    presenting the result set through a user interface.

2. The method of claim 1 wherein the user inputs the ANSI SQL expression into the client interface of a Relational Database Management System (RDBMS).

3. The method of claim 1 wherein the results are stored in a table belonging to the Relational Database Management System (RDBMS).

4. The method of claim 1 wherein the files reside on a plurality of local file systems connected by a network, said method comprising the additional step of:
    copying the files from the local-file systems into the distributed file system.

5. The method of claim 1 wherein the ANSI SQL expression may contain one or more BCAT aggregate operators, said aggregate operator concatenating the inputs that it receives, in the order that it receives those inputs, into a single value.

6. The method of claim 1 wherein an inverted index is constructed on one or more selected fields of data to improve the execution performance of running the map-reduce program for an ANSI SQL expression, said method comprising the steps of:

for each selected field partitioning the range of field values;

for each range in the partition of each selected field, creating a list of file names of the files that contain the field values belonging to that range;

retrieving the list of file names that contain values satisfying all predicate and equi-join conditions in the ANSI SQL expression; and executing the map-reduce program only on said list of file names.

7. A system, comprising:
a processor;
a memory unit operable for storing a computer program for converting ANSI SQL expressions into map-reduce programs;
an input mechanism;
an output mechanism; and
a bus coupling the processor to the memory unit, input mechanism, output mechanism, wherein the computer program is operable for performing the programming steps;
entering the ANSI SQL expression into a user interface,
converting ANSI SQL expressions into map-reduce programs,
executing said map-reduce programs on either a plurality of local file systems connected by a network, or a distributed file system,
storing the result set in either a plurality of local file systems connected by a network, or on a distributed file system, and
presenting the result set through a user interface.

8. The system of claim 7 wherein the computer program is further operable to take an input ANSI SQL expressions from the client interface of a Relational Database Management System (RDBMS).

9. The system of claim 7 wherein the computer program is further operable to output the result set to a table belonging to a Relational Database Management System (RDBMS).

10. The system of claim 7 wherein the computer program is further operable to execute an ANSI SQL expression containing one or more BCAT aggregate operators, said aggregate operator concatenating the inputs that it receives, in the order that it receives those inputs, into a single value.

11. The system of claim 7 wherein the computer program is further operable to construct an inverted index on one or more selected fields of data to improve execution performance of running the map-reduce program for an ANSI SQL expression, said computer program taking as input a partition of the range of field values for each selected field and comprising the programming step of:

for each range in the partition creating a list of file names of the files that contain field values belonging to that range;

retrieving only the list of file names from the inverted index that contain values satisfying all predicate and equi-join conditions in the ANSI SQL expression; and running the map-reduce program only on said list of file names.

* * * * *